United States Patent [19]
Obata

[11] Patent Number: 5,550,363
[45] Date of Patent: Aug. 27, 1996

[54] OPTICAL INFORMATION READING APPARATUS

[75] Inventor: Kenzo Obata, Okazaki, Japan

[73] Assignee: Nippondenso Co., Ltd., Kariya, Japan

[21] Appl. No.: 202,183

[22] Filed: Feb. 24, 1994

[30] Foreign Application Priority Data

Feb. 25, 1993 [JP] Japan .................. 5-036864
Dec. 8, 1993 [JP] Japan .................. 5-308186

[51] Int. Cl.$^6$ .................................... G06F 17/10
[52] U.S. Cl. ........................... 235/462; 235/494
[58] Field of Search .................... 235/462, 487, 235/494

[56] References Cited

U.S. PATENT DOCUMENTS

| | | | |
|---|---|---|---|
| 4,124,797 | 11/1978 | Himmel | 235/467 |
| 4,402,088 | 8/1983 | McWaters et al. | 235/454 |
| 4,454,610 | 6/1984 | Sziklai | 235/380 |
| 4,794,239 | 12/1988 | Allais | 235/462 |
| 4,939,354 | 7/1990 | Priddy et al. | |
| 5,177,343 | 1/1993 | Takenaka | 235/467 |
| 5,189,292 | 2/1993 | Batterman et al. | 235/494 |
| 5,202,552 | 4/1993 | Little et al. | 235/494 |
| 5,262,623 | 11/1993 | Batterman et al. | 235/494 |
| 5,276,315 | 1/1994 | Surka | 235/384 |
| 5,288,986 | 2/1994 | Pine et al. | 235/494 |
| 5,304,787 | 4/1994 | Wang | 235/494 |
| 5,319,182 | 6/1994 | Havens et al. | 235/462 |

FOREIGN PATENT DOCUMENTS 212579  1/1990  Japan.

OTHER PUBLICATIONS

Journal "Bar Code" (vol. 1993–11) w/English abstract.

*Primary Examiner*—Harold Pitts
*Attorney, Agent, or Firm*—Cushman, Darby & Cushman

[57] ABSTRACT

An optical information reading apparatus includes a two-dimensional image pickup apparatus having a number of photoelectric conversion elements arranged in a plane for capturing an image of optical information on a read object. The optical information reading apparatus detects a bar code contained in the captured information image and derives an area of each of bars and spaces of the bar code in the captured information image. The optical information reading apparatus recognizes and decodes the bar code using a ratio of the derived areas of the bars and the spaces of the bar code.

27 Claims, 11 Drawing Sheets

DATA STRUCTURE W = {V, N, Z, L}

| HORIZONTAL LINE NO. | | | | | |
|---|---|---|---|---|---|
| 1  | {1, 1, 0, 9}  | {1, 1, 1, 4}  | {1, 2, 0, 4}  | {1, 2, 1, 6}  | {1, 3, 0, 17} |
| 2  | {2, 1, 0, 9}  | {2, 1, 1, 3}  | {2, 2, 0, 4}  | {2, 2, 1, 6}  | {2, 3, 0, 18} |
| 3  | {3, 1, 0, 9}  | {3, 1, 1, 3}  | {3, 2, 0, 4}  | {3, 2, 1, 6}  | {3, 3, 0, 18} |
| 4  | {4, 1, 0, 9}  | {4, 1, 1, 3}  | {4, 2, 0, 4}  | {4, 2, 1, 6}  | {4, 3, 0, 18} |
| 5  | {5, 1, 0, 8}  | {5, 1, 1, 4}  | {5, 2, 0, 4}  | {5, 2, 1, 6}  | {5, 3, 0, 18} |
| 6  | {6, 1, 0, 8}  | {6, 1, 1, 4}  | {6, 2, 0, 4}  | {6, 2, 1, 6}  | {6, 3, 0, 18} |
| 7  | {7, 1, 0, 8}  | {7, 1, 1, 3}  | {7, 2, 0, 4}  | {7, 2, 1, 6}  | {7, 3, 0, 19} |
| 8  | {8, 1, 0, 8}  | {8, 1, 1, 3}  | {8, 2, 0, 4}  | {8, 2, 1, 6}  | {8, 3, 0, 19} |
| 9  | {9, 1, 0, 8}  | {9, 1, 1, 3}  | {9, 2, 0, 4}  | {9, 2, 1, 6}  | {9, 3, 0, 19} |
| 10 | {10, 1, 0, 7} | {10, 1, 1, 4} | {10, 2, 0, 4} | {10, 2, 1, 6} | {10, 3, 0, 19} |
| 11 | {11, 1, 0, 7} | {11, 1, 1, 4} | {11, 2, 0, 4} | {11, 2, 1, 6} | {11, 3, 0, 19} |
| 12 | {12, 1, 0, 7} | {12, 1, 1, 3} | {12, 2, 0, 4} | {12, 2, 1, 7} | {12, 3, 0, 19} |
| 13 | {13, 1, 0, 7} | {13, 1, 1, 3} | {13, 2, 0, 4} | {13, 2, 1, 6} | {13, 3, 0, 19} |
| 14 | {14, 1, 0, 7} | {14, 1, 1, 3} | {14, 2, 0, 4} | {14, 2, 1, 6} | {14, 3, 0, 19} |
| 15 | {15, 1, 0, 6} | {15, 1, 1, 4} | {15, 2, 0, 4} | {15, 2, 1, 6} | {15, 3, 0, 19} |
| 16 | {16, 1, 0, 6} | {16, 1, 1, 4} | {16, 2, 0, 4} | {16, 2, 1, 6} | {16, 3, 0, 19} |
| 17 | {17, 1, 0, 6} | {17, 1, 1, 3} | {17, 2, 0, 4} | {17, 2, 1, 7} | {17, 3, 0, 19} |
| 18 | {18, 1, 0, 6} | {18, 1, 1, 3} | {18, 2, 0, 4} | {18, 2, 1, 6} | {18, 3, 0, 20} |
| 19 | {19, 1, 0, 6} | {19, 1, 1, 3} | {19, 2, 0, 4} | {19, 2, 1, 6} | {19, 3, 0, 20} |
| 20 | {20, 1, 0, 5} | {20, 1, 1, 4} | {20, 2, 0, 4} | {20, 2, 1, 6} | {20, 3, 0, 20} |

(AREA OF M)  (AREA OF NB)  (AREA OF NS)  (AREA OF WB)  (AREA OF REMAINDER)

OPTICAL INFORMATION READING APPARATUS

BACKGROUND OF THE INVENTION

1. Field of the Invention

The present invention relates to an optical information reading apparatus for reading optical information, such as, bar code and/or two-dimensional information, presented on a recording medium or a read object.

2. Description of the Prior Art

Optical information reading apparatuses are known as shown, for example, in FIGS. 11(A) and 11(B). FIG. 11(A) shows the internal structure of a hand-held optical information reading apparatus 30 and FIG. 11(B) shows a bar code label 6 being read by optical information reading apparatus 30. Optical information reading apparatus 30 includes a light source 8 for emitting light to impinge on bar code label 6 having bar code 2 and optically readable characters (hereinafter also referred to as "OCR characters") 4 printed thereon, and an optical system 14 including a reflecting mirror 10 for receiving the light reflected from bar code label 6 and a condenser lens 12 for collecting the reflected light from the reflecting mirror 10 and forming an information image of the bar code label 6. The optical information reading apparatus 30 further includes a traditional image sensor 16 arranged to capture the formed information image of the bar code label 6, an electronic circuit substrate 18 provided with a signal processing circuit for processing the captured information image of the bar code label 6 to decode the bar code 2 and the OCR characters 4, and a hand-held housing 20 which accommodates the foregoing elements as a unit.

As shown in FIG. 12(A), the signal processing circuit on the electronic circuit substrate 18 includes an amplifying circuit 110 for amplifying weak analog image signals output from the image sensor 16, a digitizing circuit 112 for converting the amplified analog image signals into digital data, i.e. binary data, and an OCR character decoding circuit 114 for decoding the OCR characters 4 contained in the information image from the binary image signals output from the digitizing circuit 112. The signal processing circuit also includes a counting circuit 116 for measuring widths of bars and spaces of the bar code 2 contained in the binary image signals output from the digitizing circuit 112 corresponding to one horizontal scanning of the image sensor 16. The signal processing circuit further includes a bar code decoding circuit 118 for decoding the bar code 2 based on output signals from the counting circuit 116, and a selecting circuit 122 for activating one of the OCR character decoding circuit 114 of the bar code decoding circuit 118 in response to a switching signal a user-operated selector switch (not shown). The selected circuit 122 outputs the result of the activated circuit via an output terminal 120 to an external circuit. A power circuit (not shown) is further provided on the electronic circuit substrate 18 to supply power to the foregoing circuits.

In general, the OCR character decoding circuit 114 identifies a character using a known pattern matching method. Specifically, the OCR character decoding circuit 114 identifies a character when a pattern of the OCR character contained in the information image matches one of a plurality of prestored basic character patterns. Further, in general, the OCR character decoding circuit 114, the counting circuit 116, the bar code decoding circuit 118 and the selecting circuit 122 are realized entirely or in part as elements of a microcomputer having, such as, a CPU, a ROM and a RAM.

Since the optical information reading apparatus 30 includes OCR character decoding circuit 114 and bar code decoding circuit 118, it can read not only the bar code 2 but also the OCR characters 4 attached to the bar code 2, and thus can also read characters printed on other media.

Accordingly, the optical information reading apparatus 30 has a wider range of applications than a normal bar code reading apparatus for reading only the bar code 2. Further, the bar code 2 is dirty and the optical information reading apparatus 30 is unable to read the bar code 2, the necessary information can be read from the bar code label 6 by reading the OCR characters 4 attached to the bar code 2.

However, to ensure that the level of accuracy for the conventional optical information reading apparatus 30 is as high as that of a bar code reading apparatus for reading only the bar code 2, an expensive two-dimensional image pickup apparatus, such as, an image pickup apparatus for HDTV high-definition television), having a large number of picture elements, particularly in the horizontal direction, should be employed as the image sensor 16, or a line sensor for reading the bar code 2 should be provided within or separately from the image sensor 16.

Specifically, as shown in FIG. 12(B), a two-dimensional image sensor 16 may be formed by arranging a large number of photoelectric conversion elements (picture elements), such as CCDs, in longitudinal and transverse directions. If an inexpensive two-dimensional image pickup apparatus having some hundreds of picture elements arranged in the horizontal direction is employed as the image sensor 16, OCR characters 4 can be decoded, but difficulty is likely to be encountered in decoding the bar code 2. Specifically, since the OCR characters 4 can be decoded using the pattern matching method described above and further since the OCR characters 4 can be arranged in a less delicate manner than the bar arrangement of the bar code 2, the image of the OCR characters 4 can be decodably captured without difficulty even by the foregoing inexpensive image pickup apparatus. On the other hand, for decoding the bar code 2, lengths of and spaces in a horizontal scanning direction should be measured precisely. However, the foregoing inexpensive image pickup apparatus is unable to provide an image resolution necessary for precisely measuring small scale bar code lengths and decoding such a bar code. Accordingly, in order to ensure a reading accuracy for the bar code 2 as high as that provided by the bar code reading apparatus for reading only the bar code 2, a line sensor having some thousands of photoelectric conversion elements in line, which has been used in conventional bar code reader, should be provided within or separately from the image sensor 16 for reading the bar code 2, or an expensive two-dimensional image pickup apparatus, such as an image pickup apparatus for HDTV, having some thousands of picture elements in the horizontal direction, should be employed as the image sensor 16.

The foregoing problems are not limited to the optical information readers for reading bar code and OCR characters but also apply to optical information reader for reading bar code and two-dimensional code such as a so-called matrix code (for example, Data Code and Veri Code) which is formed by white and black cells arranged in a matrix, or a so-called stacked bar code (for example, PDF417) which includes bar code-like data in a stacked fashion.

These two-dimensional codes are disclosed and introduced, for example, in Japanese First (unexamined) Patent Publication No. 2-12579 and in the journal "Bar Code" (vol. 1993-11 published by Japan Industrial Publishing Co., Ltd.).

In order to compensate for an insufficient number of picture elements in an image sensor, it has been proposed to increase the apparent number of picture elements by mechanically vibrating the image sensor to capture multiple images, and synthesizing the captured images. However, since the image sensor itself is mechanically vibrated, durability is reached. Accordingly, the proposed method is not desirable, particularly for hand-held optical information readers.

SUMMARY OF THE INVENTION

Therefore, it is an object of the present invention to provide an improved optical information reading apparatus which is capable of reading both bar code and two-dimensional information, while using a conventional inexpensive image sensor having a relatively small number of picture elements.

According to one aspect of the present invention, an optical information reading apparatus comprises a light source for emitting light onto an object bearing optical information; an optical system for collecting light reflected from the object and forming an information image indicative of the optical information at a predetermined reading position; two-dimensional image pickup means having a number of photoelectric conversion elements arranged in a plane, the two-dimensional image pickup means provided at the reading position for capturing the information image; storing means for storing the information image captured by the two-dimensional image pickup means; two dimensional information decoding means for recognizing two dimensional information in the information image stored by the storing means and decoding the recognized two-dimensional information; region detecting means for detecting a region of each of the bars and spaces of a bar code in the information image stored by the storing means; and bar code decoding means for decoding the bar code based on an area ratio of the regions detected by the region detecting means.

According to another aspect of the present invention, an optical information reading apparatus comprises a light source for emitting light onto an object bearing optical information; an optical system for collecting the light reflected from the object and forming an information image indicative of the optical information at a predetermined reading position; two-dimensional image pickup means having a number of photoelectric conversion elements arranged in a plane, the two-dimensional image pickup means provided at the reading position for capturing the information image; storing means for storing the information image captured by the two-dimensional image pickup means; two-dimensional information decoding means for recognizing two-dimensional information in the information image stored by the storing means and decoding the recognized two-dimensional information; area deriving means for detecting a bar code contained in the information image stored by the storing means, the bar code having bars and space, and for deriving an area of each of the bar and the space in the information image; and bar code decoding means for decoding the bar code based on a ratio of the areas of the bar and the space derived by the area deriving means.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limiting. In the drawings:

FIG. 7 is an explanatory diagram showing region data produced based on the information image shown in FIG. 6;

DESCRIPTION OF THE PREFERRED EMBODIMENT

Now, preferred embodiments of the present invention will be described with reference to the accompanying drawings.

Figure 11A:
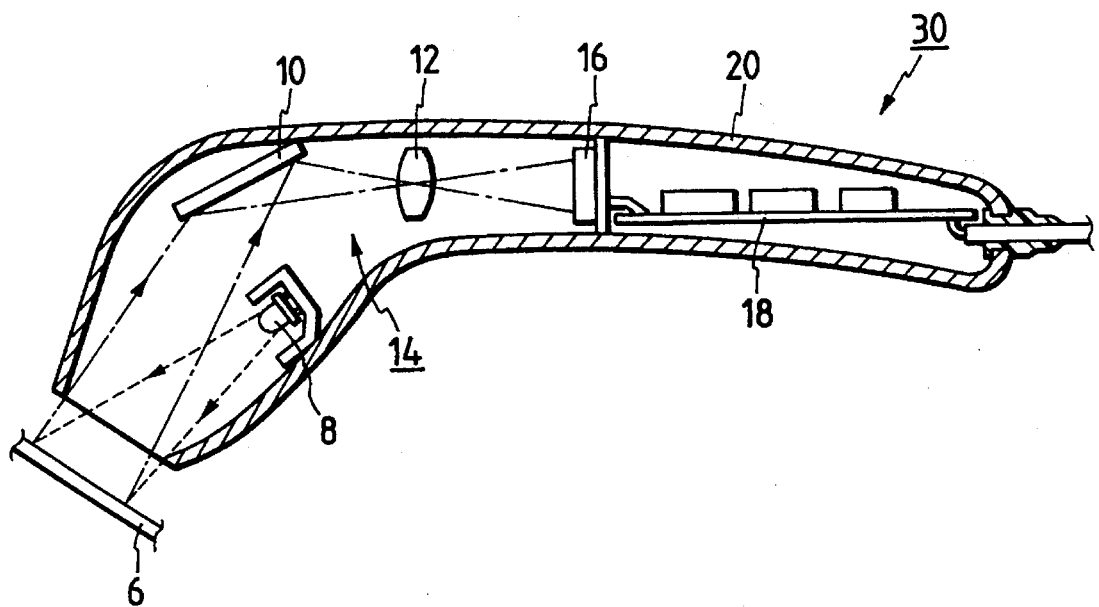
FIG. 11(A) is a schematic sectional view showing the entire structure of a conventional optical information reading apparatus.
Figure 11B:
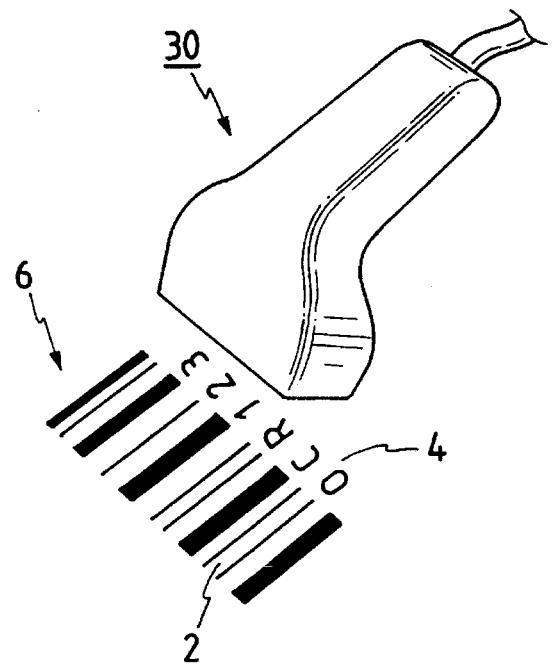
FIG. 11(B) is an explanatory diagram showing a state of the conventional optical information reading apparatus reading a bar code label.
Figure 12A:
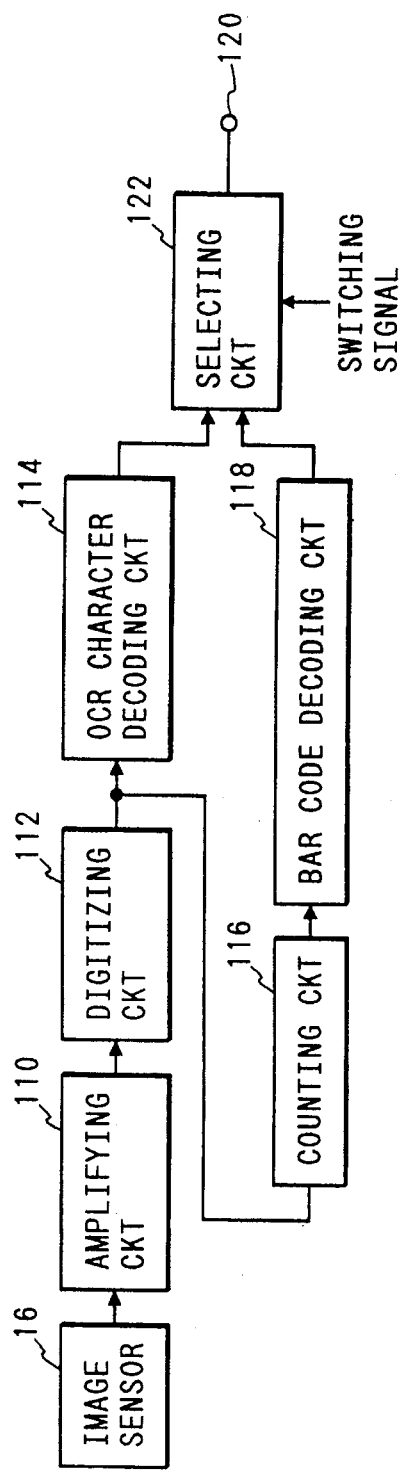
FIG. 12(A) is a block diagram showing the structure of a signal processing circuit in the conventional optical information reading apparatus.
Figure 12B:
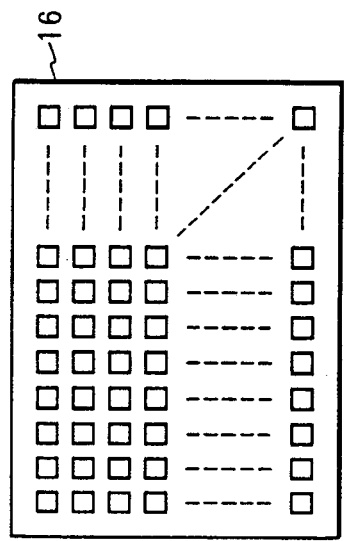
FIG. 12(B) is an explanatory diagram showing the arrangement of picture elements in an image sensor employed in the conventional optical information reading apparatus.

FIGS. 11(A) and 11(B) both apply to an optical information reading apparatus according to a first preferred embodiment of the present invention. Specifically, the optical information reading apparatus of the first preferred embodiment differs from that of FIG. 11(A) only in the structure of the signal processing circuit incorporated in the electronic circuit substrate 18. Accordingly, the following description does not refer to the entire structure of the optical information reading apparatus, but refers in detail to the structure and operation of a signal processing circuit incorporated in the electronic circuit substrate 18 in the first preferred embodiment.

Figure 1:
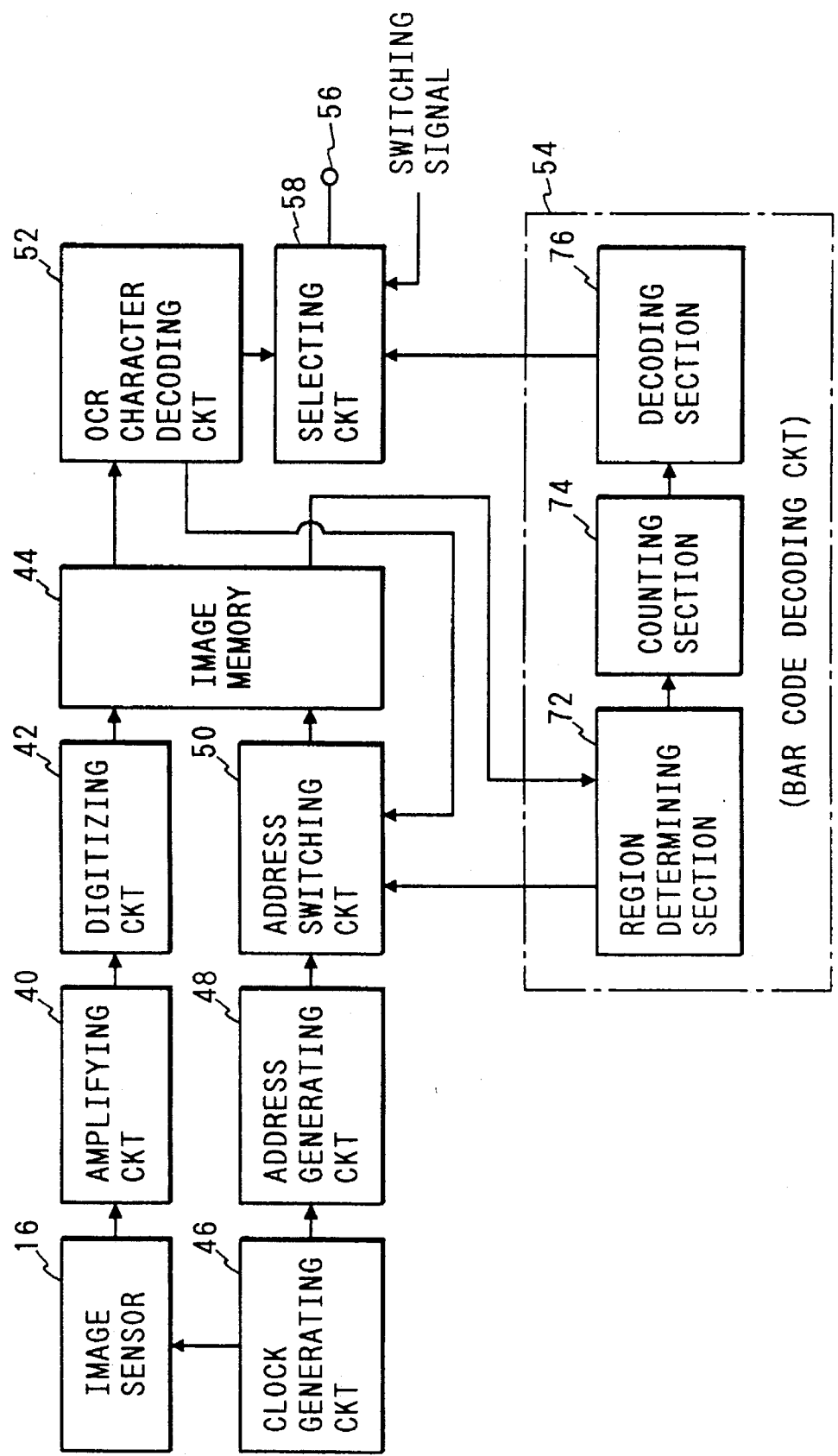
FIG. 1 is a block diagram showing the structure of a signal processing circuit in an optical information reading apparatus according to a first preferred embodiment of the present invention.

The hand-held type optical information reading apparatus according to the first preferred embodiment includes the signal processing circuit as shown in FIG. 1. The signal processing circuit includes an amplifying circuit 40 for amplifying weak analog image signals output from the image sensor 16, a digitizing circuit 42 for converting the amplified analog image signals into digital data, i.e. binary data, and an image memory 44 for storing the digitized image signals in sequence so as to store an information image of the bar code label 6 captured by the image sensor 16.

Specifically, an address generating circuit 48 sequentially generates addresses in the image memory 44 synchronously with clock signals from a clock generating circuit 46 for triggering scanning of the image sensor 16, and the digitized image signals from the digitizing circuit 42 are sequentially stored in the image memory 44 by inputting the generated addresses into the image memory 44 via an address switching circuit 50. The image sensor 16 scans the picture elements in one horizontal line, triggered by the clock signals from the clock generating circuit 46, and outputs image signals corresponding to the scanned picture elements. When the scanning of one horizontal line is completed, the image sensor 16 performs scanning of the picture elements in a next horizontal line below the scanned horizontal line, triggered by the corresponding clock signals, so as to output corresponding image signals. In this manner, the image sensor 16 performs horizontal scanning of the picture elements in sequence in the vertical direction and outputs corresponding image signals of the information image captured by the image sensor 16. Accordingly, in this preferred embodiment, the address generating circuit 48 is arranged to sequentially generate addresses in the image memory 44 synchronously with the clock signals for inputs to the image memory 44 via the address switching circuit 50, so that the image signals corresponding to the respective picture elements forming the image sensor 16 are sequentially stored in the image memory 44.

It is to be appreciated that the address generating circuit 48 generates the addresses, which have been preset in the image memory 44, in sequence synchronously with the clock signals, so as to ensure correspondence between the respective picture elements of the image sensor 16 and the addresses in the image memory 44.

The signal processing circuit further includes an OCR character decoding circuit 52 for decoding the OCR characters 4 contained in the information image stored in the image memory 44, a bar code decoding circuit 54 for decoding the bar code 2 contained in the information image stored in the image memory 44, and a selecting circuit 58 for activating one of either the OCR character decoding circuit 52 or the bar code decoding circuit 54 based on a switching signal which is input to the selecting circuit 58 when a user operates a selector switch (not shown), so as to output the decoding result of the activated circuit via an output terminal 56 to an external circuit.

As described above, the address switching circuit 50 inputs the addresses generated by the address generating circuit 48 into the image memory 44 when the information image is stored in the image memory 44. During operation of the OCR character decoding circuit 52 or the bar code decoding circuit 54, the address switching circuit 50 stops the address input into the image memory 44 so as to stop the image memory 44 from storing the information image, but allows access to the image memory 44 by the OCR character decoding circuit 52 or the bar code decoding circuit 54. Specifically, the address switching circuit 50 inputs into the image memory 44 an address from OCR character decoding circuit 52 or the bar code decoding circuit 54 for reading out the information image stored in the image memory 44. As a result, the image memory 44 outputs the image data corresponding to the address input to the OCR character decoding circuit 52 or the bar code decoding circuit 54. Accordingly, during the operation, the OCR character decoding circuit 52 or the bar code decoding circuit 54 can read out the information image from the image memory 44.

Figure 2:
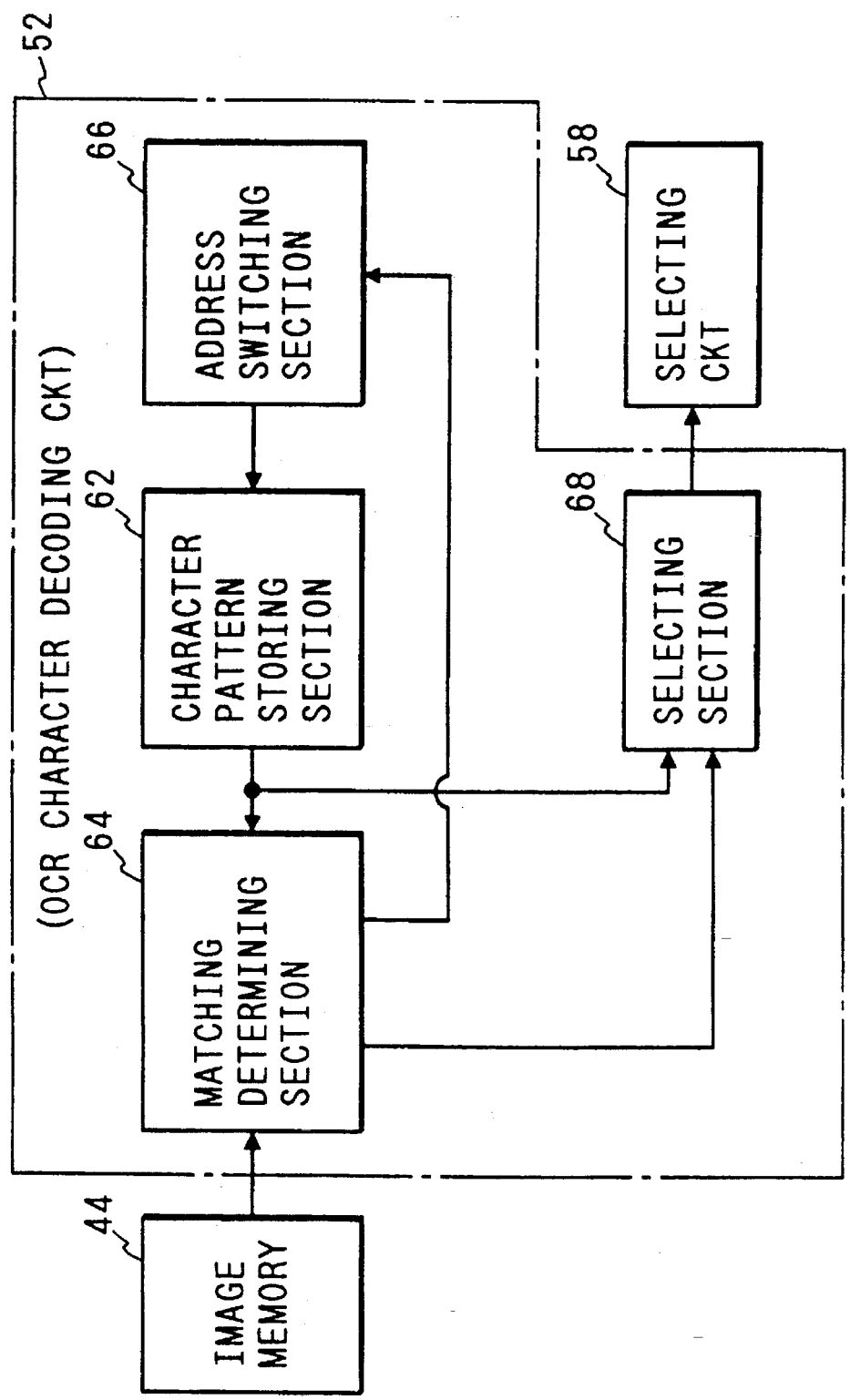
FIG. 2 is a block diagram showing the structure of an OCR character decoding circuit in the optical information reading apparatus according to the first preferred embodiment.

The OCR character decoding circuit 52 in this preferred embodiment recognizes the OCR characters 4 contained in the information image stored in the image memory 44, using the pattern matching method. As shown in FIG. 2, the OCR character decoding circuit 52 includes a character pattern storing section 62 for prestoring basic patterns of the characters to be decoded, and a matching determining section 64 for outputting addresses to the address switching circuit 50 so as to read out the information image from the image memory 44 and for comparing a pattern of a character contained in the information image with the prestored basic character patterns in the character pattern storing section 62 in sequence so as to derive matching degrees therebetween, respectively. The OCR character decoding circuit 52 further includes an address switching or pattern switching section 66 which, in response to a character pattern changing command output from the matching determining section 64 every time the matching determining section 64 compares the pattern of the character to be decoded with one of the prestored basic character patterns, switches an address for accessing the stored basic character pattern to allow the character pattern storing section 62 to output the corresponding basic character pattern to the matching determining section 64. The OCR character decoding circuit 52 further includes a selecting section 68 for selecting the basic character pattern, for each of the characters contained in the information image, which has the highest matching degree derived by the matching determining section 64. The selecting section 68 outputs the selected basic character pattern to the selecting circuit 58 after determining that the character represented by the selected basic character pattern is the character to be decoded.

Figure 3A:
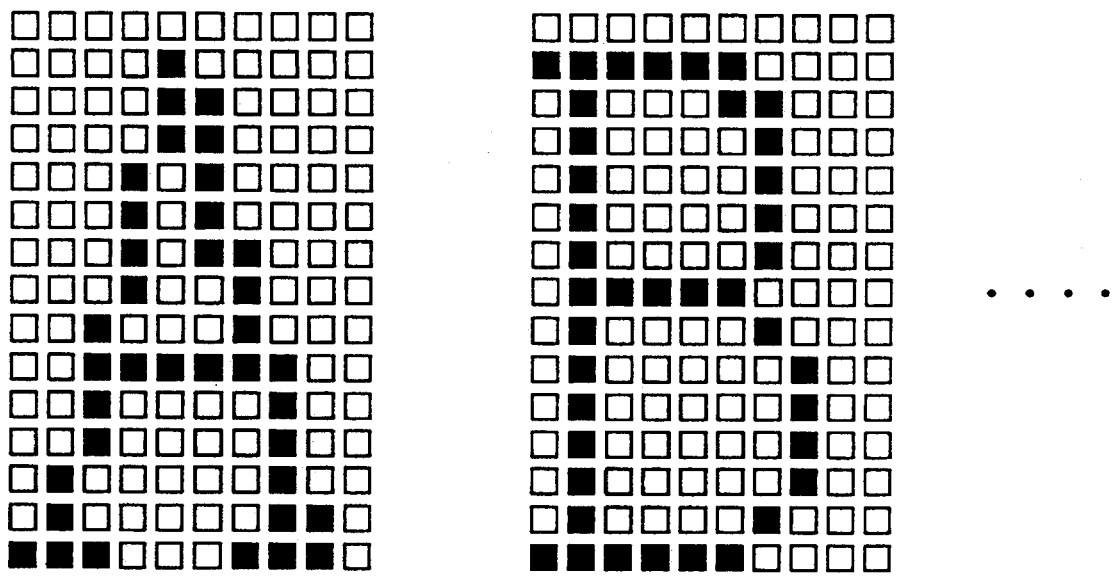
FIGS. 3(A) and 3(B) are explanatory diagrams for explaining the operation of the OCR character decoding circuit of FIG. 2.
Figure 3B:
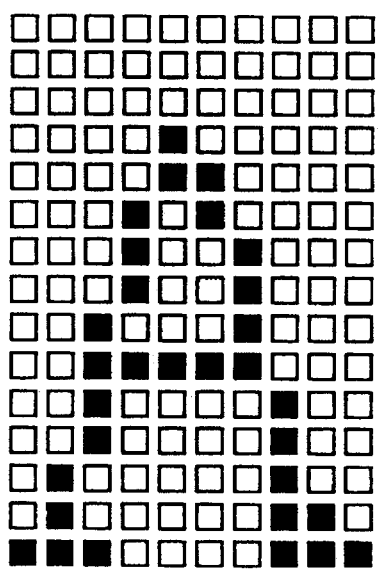

As shown in FIG. 3(A), in the character pattern storing section 62, dot data representing each of the characters to be decoded (for example, A, B, ---) is prestored as the basic character pattern. In the matching determining section 64, the character (for example, A) in the information image read out from the image memory 44 is converted to dot data corresponding to those of the prestored basic character pattern as shown in FIG. 3(B). Thereafter, the matching determining section 64 derives the number Di of dots which match between the converted dot data and the prestored basic character pattern. The matching determining section 64 further derives the matching degree (=Di/Dj) between the character to be decoded and the basic character pattern based on the dot number Di and the total number Dj of the dots forming the basic character pattern. In this manner, the matching determining section 64 derives the matching degree between the character to be decoded and each of the basic character patterns prestored in the character pattern storing section 62. As described above, the selecting section 68 selects the basic character pattern having the highest matching degree to be output to the external circuit via the output terminal 56 for each of the characters to be decoded.

As appreciated, when a large number of the characters exist in the information image read out from the image memory 44, the foregoing decoding process is performed for each of the characters to be decoded so that all the characters in the information image are recognized.

Referring back to FIG. 1, the bar code decoding circuit 54 includes a region determining section 72 for outputting addresses to the address switching circuit 50 to read out the information image from the image memory 44 and for determining a region of each of the bars and spaces forming the bar code 2 in the information image. The bar code decoding circuit 54 further includes a counting section 74 for counting the number of image memory addresses of each of the determined regions, that is, the number of the picture elements forming or capturing the image of each of the determined regions, so as to derive an area or a size of each region in the information image. The bar code decoding circuit 54 further includes a decoding section 76 for decoding the bar code 2 based on a ratio of the areas of the determined regions derived by the counting section 74.

In practice, the bar code decoding circuit 54 is formed by a microcomputer having elements such as a CPU, a ROM and a RAM, and the foregoing sections 72, 74 and 76 are realized as functions of the microcomputer.

Figure 4:
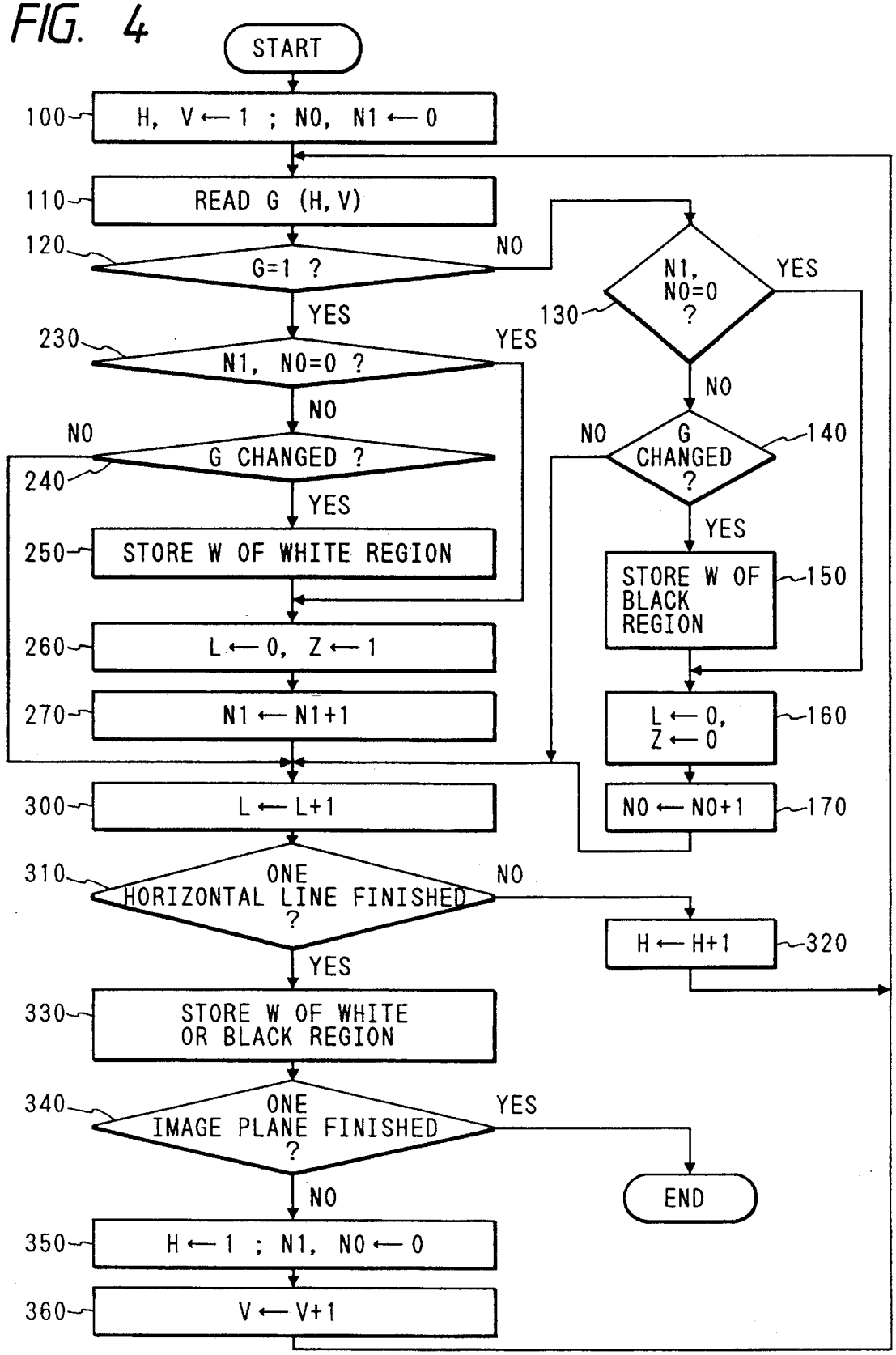
FIG. 4 is a flow chart of a control routine for controlling the operation of a region determining section of a bar code decoding circuit in the optical information reading apparatus according to the first preferred embodiment.
Figure 5:
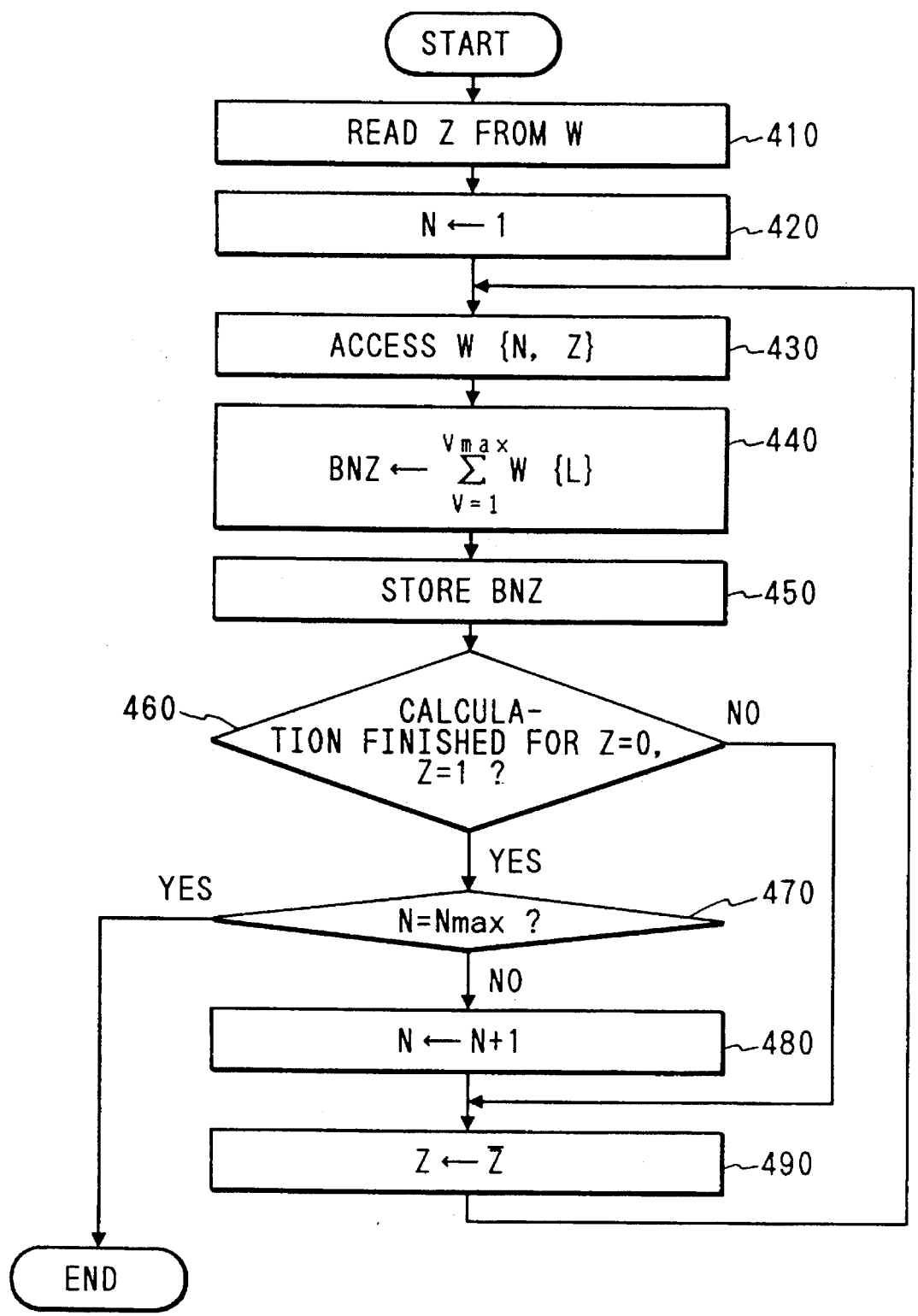
FIG. 5 is a flow chart of a control routine for controlling the operation of a counting section of the bar code decoding circuit in the optical information reading apparatus according to the first preferred embodiment.

Referring now to FIGS. 4 and 5, the operations of the region determining section 72 and the counting section 74 in the bar code decoding circuit 54 will be described in detail.

Figure 6:
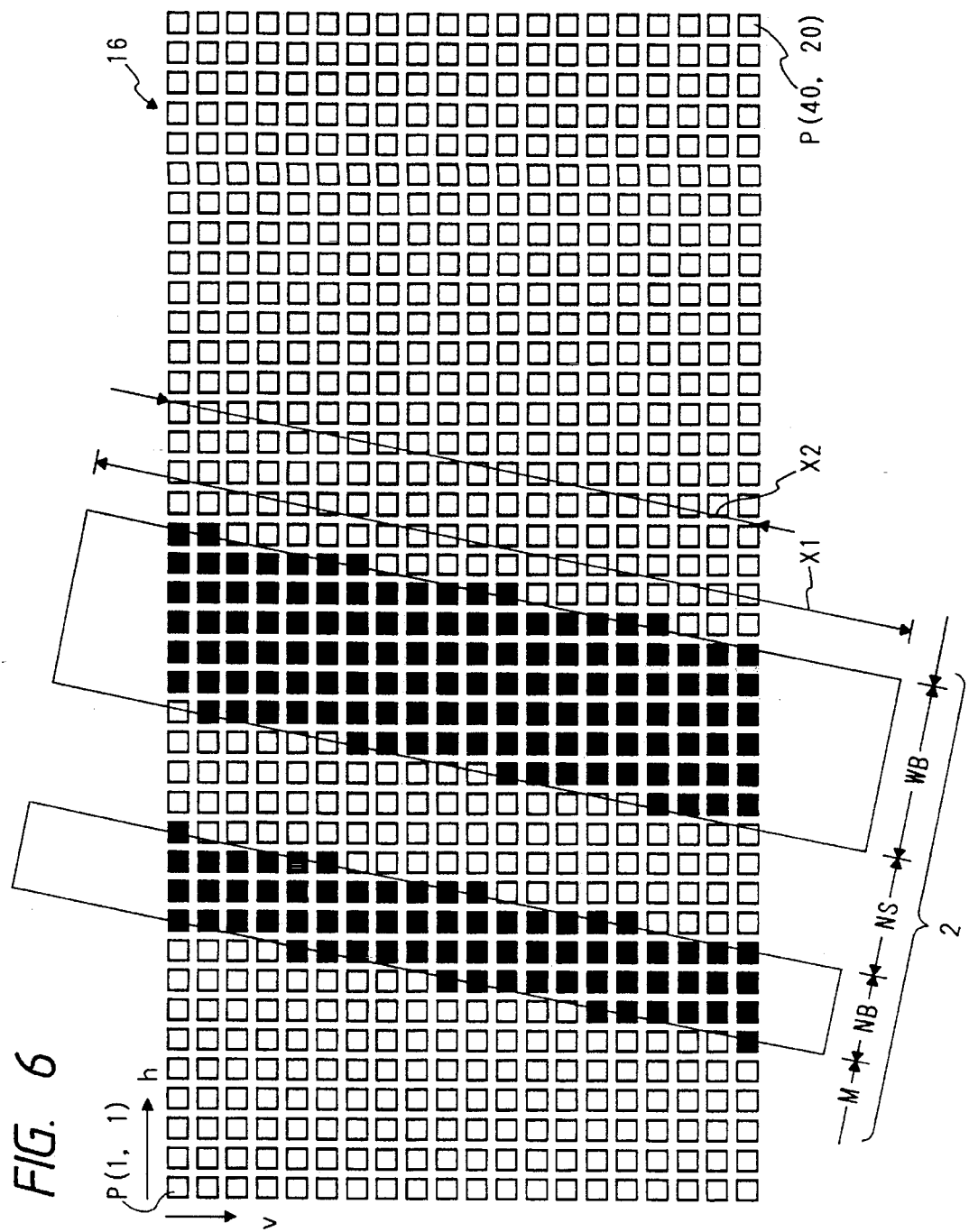
FIG. 6 is an explanatory diagram showing an information image captured by an image sensor in the optical information reading apparatus according to the first preferred embodiment.

To simplify the explanation, it is assumed, as shown in FIG. 6, that the image sensor 16 includes 40 picture elements in the horizontal direction (→h), 20 picture elements in the vertical direction (→v), and thus a total of 800 picture elements "P(h, v) {=P(1,1)~P(40, 20)}", that the image sensor 16 captures the information image of the bar code 2 having a margin M, a narrow bar NB, a narrow space NS and a wide bar WB, and that this information image is stored in the image memory 44.

FIG. 4 shows a flow chart of a control routine for controlling the operation of the region determining section 72.

As shown in FIG. 4, when the region determining process is started, a step 100 executes initialization to set values of counters H and V to "1" and values of counters N0 and N1 to "0".

The counters H and V are used for identifying the picture element P(h, v). Specifically, a value of the counter H corresponds to a number h of the picture element P(h, v) in the horizontal direction, and a value of the counter V corresponds to a number v of the picture element P(h, v) in the vertical direction. On the other hand, a counter value N0 represents a region number assigned to each of the white regions, such as, the margin M and the narrow space NS in FIG. 6, in each horizontal line and increases by "1" in the horizontal scanning of the white regions in one horizontal line. A counter value N1 represents a region number which is assigned to each of the black regions, such as, the narrow bar NB and the wide bar WB in FIG. 6, in each horizontal line and increases by "1" in the horizontal scanning of the black regions in one horizontal line.

Subsequently, a step 110 reads out image data G(H, V) of the picture element P(h, v) corresponding to values of the counters H and V from the image memory 44 by inputting a corresponding read address into the image memory 44 via the address switching circuit 50. Thereafter, a step 120 determines whether the image data G read out in step 110 is a value "1", which represents "black" or a value "0", which represents "white". If the image data is "0", the routine proceeds to step 130. On the other hand, if the image data is "1", the routine proceeds to step 230.

In step 130, it is determined whether values of the counters N0 and N1 are both "0". When the values of the counters N0 and N1 are both "0", the routine proceeds to step 160 as determining that the scanning of one horizontal line of the image sensor 16 has just started. On the other hand, when the step 130 determines that at least one of the counters N0 and N1 has a value other than "0", step 140 determines whether the image data G read out at the step 110 in the current execution cycle (hereinafter also referred to as "current image data G") changes or differs from image data G read out at the step 110 in the last execution cycle (hereinafter also referred to as "last image data G"), that is, whether the last image data G was "1" representing "black".

When the step 140 determines that the current image data G is the same as the last image data G, the routine proceeds to step 300. On the other hand, when the step 140 determines that the current image data G changes from the last image data G, the routine proceeds to step 150 where region data W={V, N, Z, L} of the black region which continues in one horizontal line up to the change from "black" to "white" is formed based on values of the counters V and N1, a flag Z and a counter L and stored in a RAM (not shown).

Subsequently, the routine proceeds to step 160 which sets a value of the counter L to "0" and resets the flag Z for preparing region data W of the white region now started. During subsequent step 170, the counter N0 representing the region number of the white region is incremented by "1", and the routine proceeds to step 300.

A value of the counter L represents the number of picture elements providing the continuous white or black region in one horizontal line, that is, a length of the bar or space in the width direction. The flag Z represents a color (white or black) of the scanned region.

During step 230 which is executed when the step 120 determines the image data G being "1" representing "black", it is determined, as in the foregoing step 130, whether values of the counter N0 and N1 are both "0". When the values of the counters N0 and N1 are both "0", the routine proceeds to step 260 as determining that the scanning of one horizontal line of the image sensor 16 has just started. On the other hand, when step 230 determines that at least one of the counters N0 and N1 has a value other than "0", step 240 determines whether the current image data G changes or differs from last image data G, that is, whether the last image data G was "0" representing "white".

When step 240 determines that the current image data G is the same as the last image data G, the routine proceeds to step 300. On the other hand, when step 240 determines that the current image data G is different from the last image data G, the routine proceeds to step 250 where region data W={V, N, Z, L} of the white region which continues in one horizontal line up to the change from "white" to "black" is produced based on values of the counters V and N0, the flag Z and the counter L and stored in the RAM.

Subsequently, the routine proceeds to step 260 which sets the value of the counter L to "0" and sets the flag Z for preparing region data W of the black region now started. At subsequent step 270, the counter N1 representing the region number of the black region is incremented by "1", and the routine proceeds to the step 300.

During step 300, the value of the counter L is incremented by "1". Subsequently, step 310 determines whether the reading of the image data corresponding to all the picture elements in one horizontal line of the image sensor 16 is completed or finished. When not yet finished, the routine proceeds to step 320 where a value of the counter H is incremented by "1", and returns to step 110.

On the other hand, when step 310 determines that the reading of the image data in one horizontal line of the image sensor 16 is finished, the routine proceeds to step 330 where region data W={V, N, Z, L} of the white or black region which has continued up to now in one horizontal line is formed based on values of the counter V, the counter N0 or N1, the flag Z and the counter L and stored in the RAM.

The routine then proceeds to step 340 which determines whether the reading of the image data corresponding to all the picture elements in one image plane of the image sensor 16 is finished. When the reading of the image data in one image plane is finished, the routine is terminated. If not yet finished, subsequent step 350 sets the value of the counter H to the initial value "1" and values of the counters N0 and N1 to the initial value "0". Subsequently, step 360 increments the value of the counter V by "1", and the routine returns to step 110.

As appreciated from the foregoing description, the steps 110 to 330 represent the process for generating the region data W for the white and black regions in each horizontal line of the image sensor 16. Assuming that the information image stored in the image memory 44 is that shown in FIG. 6, the region data W in the horizontal line (No. 1) as shown in FIG. 7 are formed in sequence immediately after the execution of initialization at step 100.

Specifically, as shown in FIG. 6, in the uppermost horizontal line of the image sensor 16, the picture elements P(1, 1) to P(9, 1) capture an image of the white region corresponding to the margin M, the picture elements P(10, 1) to P(13, 1) capture an image of the black region corresponding to the narrow bar NB, the picture elements P(14, 1) to P(17, 1) capture an image of the white region corresponding to the narrow space NS, the picture elements P(18, 1) to P(23, 1) capture an image of the black region corresponding to the wide bar WB, and the picture elements P(24, 1) to P(40, 1) capture an image of the remaining white region.

Accordingly, immediately after initialization at step 100, step 110 reads out, corresponding to the initial values (1, 1) of the counters H and V, the image data G of the picture element P(1, 1) representing "white". The routine then proceeds from step 120 to step 130. Since values of the counters N0 and N1 are set to "0" at the step 100, the routine proceeds from step 130 to step 160. At steps 160 and 170, the counter L is set to a value "0", the counter N0 is set to a value "1", and the flag Z is reset to a value "0" representing "white". Thereafter, step 300 sets the counter L to a value "1", and the routine proceeds via step 310 to step 320 which sets the counter H to a value "2".

The routine then returns to step 110 which this time reads out the image data G of the picture element P(2, 1) corresponding to values (2, 1) of the counters H and V. Since this current image data G is the same as the last image data G, the routine proceeds via steps 120, 130 and 140 to step 300 which sets the value of counter L to "2". Thereafter, the routine proceeds via step 310 to step 320 which sets the value of counter H to "3".

When the value of counter H reaches "9" at the step 320, the value of counter L is set to "9" at the step 300 in the next execution cycle thereof. When the value of counter H reaches "10" at step 320, step 110 reads out, corresponding to values (10, 1) of the counters H and V, the image data G of the picture elements P(10, 1) representing "black", and the routine proceeds from step 120 to step 230.

Since the value of counter N0 is updated from the initial value "0", the routine proceeds from step 230 to step 240 which determines that the current image data G has changed from a value "0" representing "white" to a value "1" representing "black". Accordingly, step 250 produces the region data W of the white region which continues up to the change from "white" to "black", that is, the region data W of the margin M, based on currently set values of counter V, the counter N0, the flag Z and the counter L. As shown in FIG. 7, step 250 produces the region data W of the margin M as {1, 1, 0, 9}, and stores it in the RAM.

Thereafter, at steps 260 and 270, the value of counter L is set to "0", the value of counter N1 is set to "1", and the value of flag Z is set to "1" representing "black". Subsequently, step 300 sets the value of counter L to "1", and routine proceeds via the step 310 to step 320 which sets the value of counter H to "11", and then returns to step 110.

Step 110 reads out, corresponding to values (11, 1) of the counters H and V, the image data G of the picture element P(11, 1). Since this current image data G is the same as the last image data G, the routine proceeds via steps 120, 230 and 240 to step 300 which sets the value of counter L to "2". Subsequently, the routine proceeds via step 310 to step 320 where the value of counter H is set to "12".

When the value of counter H reaches "13" at step 320, the value of counter L is set to "4" at step 300 in the next execution cycle thereof. When the value of counter H reaches "14" at the step 320, step 110 reads out, corresponding to values (14, 1) of the counters H and V, the image data G of the picture elements P(14, 1) representing "white", and the routine proceeds from step 120 to step 130.

Since values of the counters N0 and N1 are updated from the initial value "0", the routine proceeds from step 130 to step 140 which determines that the current image data G changes from a value "1" representing "black" to a value "0" representing "white". Accordingly, step 150 produces region data W of the black region which continues up to the change from "black" to "white", that is, region data W of the narrow bar NB, based on currently set values of the counter V, the counter N1, the flag Z and the counter L. As shown in FIG. 7, step 150 produces the region data W of the narrow bar NB as {1, 1, 1, 4}, and stores it in the RAM.

Thereafter, as in case of margin M and narrow bar NB, image data G of the picture elements corresponding to the narrow space NS and wide bar WB are read out in sequence so that region data W of the narrow space NS and the wide bar WB are produced as {1, 2, 0, 4}, and {1, 2, 1, 6}, respectively, as shown in FIG. 7 and are stored in the RAM.

Further, as in the foregoing, image data G of the picture elements P(24, 1) to P(40, 1) representing the remaining white region are read out, respectively. When step 310 determines that the image data G corresponding to all the picture elements in one horizontal line is finished, the routine proceeds from step 310 to step 330 where region data W of the remaining white region is produced as {1, 3, 0, 17} as shown in FIG. 7 and stored in the RA-M. Accordingly, region data W of margin M, narrow bar NB, narrow space NS, wide bar WB and the remaining white region, that is, all the region data W in one horizontal line of the image sensor 16, are stored in the RAM.

After the execution of step 330, step 340 determines whether all the image data G in one image plane has been read. When finished, the routine is terminated and a later described region counting process of FIG. 5 is started. If not yet finished, the routine proceeds to step 350 where counters H, N0 and N1 are set to the initial values, respectively, and further to step 360 where the value of counter V is incremented by "1". Thereafter, the routine returns to step 110 to execute steps 110 to 330 as in the foregoing so that region data W for a next horizontal line are produced.

Accordingly, by executing the region determining process as represented by the flow chart of FIG. 4, the image data G of all the picture elements in the image sensor 16 are processed so that, as shown in FIG. 7, region data W of margin M, narrow bar NB, narrow space NS, wide bar WB and the remaining white region in all the horizontal lines (Nos. 1~20) of the image sensor 16 are produced and stored in the RAM.

FIG. 5 shows a flow chart of a routine for controlling the operation (region counting process) of the counting section 74. The region counting process is executed for deriving an area or a size of each of the foregoing regions in the information image based on the region data W derived by the foregoing region determining process.

As shown in FIG. 5, when the region counting routine is started, step 410 reads out the value of flag Z from the first region data W among the stored region data W produced by the region determining process and sets this value as an initial value of the flag Z. As described before, the value of flag Z represents a color (white or black) of the corresponding region. Assuming that the region data W are as shown in FIG. 7, step 410 reads out a value "0" of flag Z, representing "white", from the region data W {=1, 1, 0, 9} of the margin M in the uppermost horizontal line of the image sensor 16 and sets this value as an initial value of the flag Z. Subsequently, a step 420 sets a counter N to an initial value "1". The value of counter N corresponds to the value of the counter N0 or N1.

Thereafter, step 430 accesses the region data W {N, Z} in sequence corresponding to the currently set values of the flag Z and the counter N and reads out values W {L} of the counter L of all the region data W {N, Z}. As described before, the value of the counter L represents the number of the picture elements in the corresponding region, represented by the region data W, in one horizontal line. Subsequently, the routine proceeds to step 440 which derives an area BNZ of the region represented by the region data W {N, Z} by calculating a sum of all the read-out values W{L}. Accordingly, step 440 derives the area BNZ in the form of the number of the picture elements contained in the corresponding region.

For example, it is assumed that the region data W are as shown in FIG. 7 and that the routine is now immediately after the flag Z and the counter N are set to the initial values at steps 410 and 420, respectively. Since flag Z=0 and counter N =1, the step 430 accesses in sequence the region data W of the margin M represented by those values and reads out all the values (9, 9, ---, 6, 5) of the counter L within the accessed region data W. Thereafter, step 440 derives an area BNZ of the margin M as a sum (146) of all the read-out values.

After the execution of step 440, the routine proceeds to step 450 where the derived area BNZ is stored in the RAM, and further to step 460 which determines whether the calculation of the area BNZ of each of the regions represented by the flag Z=0 and the flag Z=1 within the region data W {N} corresponding to the currently set value of the counter N, is finished. When not yet finished, the routine proceeds to step 490 where the value of the flag Z is inverted, and then returns to step 430 to execute the foregoing processes.

For example, it is assumed that the region data W are as shown in FIG. 7 and that the routine is now immediately after the area BNZ of the margin M is derived and stored at steps 440 and 450, respectively. Since, among the region data W of the margin M and the narrow bar NB represented by the counter N=1, the region data W having flag Z=1 and representing the narrow bar NB are not yet processed for calculating the area BNZ of the narrow bar NB, step 460 produces a negative answer. Accordingly, the routine proceeds to the step 490 which inverts the flag Z from the initial value "0" to a value "1", and then returns to step 430. This time, step 430 accesses in sequence the region data W of the narrow bar NB, which corresponds to the counter N=1 and the flag Z=1, and reads out all the values (4, 3, ---, 3, 4) of the counter L within the accessed region data W. Subsequently, step 440 derives the area BNZ of the narrow bar NB as a sum (68) of all the read-out values of the counter L, and step 450 stores the derived area BNZ in the RAM.

On the other hand, when step 460 produces a positive answer, the routine proceeds to step 470 which determines whether the currently set value of the counter N is a maximum value Nmax in the region data W produced by the foregoing region determining process. When counter N=Nmax, the routine is terminated as determining that the calculation of the areas BNZ of all the regions in the information image captured by the image sensor 16 is finished. On the other hand, when counter N<Nmax, the routine proceeds to step 480 where the value of the counter N is incremented by "1", and further to step 490.

It is assumed that the region data W are as shown in FIG. 7 and that the routine is now immediately after the calculation of the areas BNZ of the margin M and the narrow bar NB, which correspond to flag Z=0 and flag Z=1 when counter N=1, is finished, step 470 produces a negative answer, step 480 sets the counter N to a value "2", and step 490 inverts the flag Z from a value "1" to a value "0". Subsequently, step 430 accesses in sequence the region data W of the narrow space NS, which corresponds to counter N=2 and flag Z=0, and reads out all the values (4, 4, ---, 4, 4) of the counter L within the accessed region data W. Then, step 440 derives the area BNZ of the narrow space NS as a sum (80) of all the read-out values of the counter L, and step 450 stores the derived area BNZ in the RAM. Thereafter, the calculation of the areas BNZ of the wide bar WB and the remaining white area is performed as in the foregoing so that step 440 derives the areas BNZ of these regions as 122 and 376, respectively.

After the areas of BNZ of all the regions in the information image captured by the image sensor 16 are derived in the foregoing region counting process, the bar code 2 is recognized and decoded using a ratio or combination of the areas BNZ of the respective regions through a decoding process (not shown) executed by the decoding section 76.

It is assumed, in FIG. 6, that actual widths of the margin M, the narrow bar NB, the narrow space NS and the wide bar WB are given as ML1, NBL1, NSL1 and WBL1, respectively, widths thereof on the image plane of the image sensor 16 are given as ML2, NBL2, NSL2 and WBL2, respectively, actual lengths thereof are given as X1, respectively, and lengths thereof on the image plane of the image sensor 16 are given as X2, respectively. In this case, a ratio of the actual widths of these regions {ML1: NBL1: NSL1: WBL1} or a ratio of the actual areas of these regions {ML1.X1: NBL1.X1: NSL1.X1: WBL1.X1} becomes substantially equal to a ratio of the areas of these regions on the image plane of the image sensor 16 {ML2.X2: NBL2.X2: NSL2.X2: WBL2.X2}. As appreciated, in order to allow these ratios to be substantially equal to each other, the first and last bars of the bar code 2 should be positioned to cross the uppermost and lowermost horizontal lines as shown in FIG. 6.

Accordingly, using a ratio of the areas BNZ of the margin M, the narrow bar NB, the narrow space NS, the wide bar WB and the remaining white region derived by the foregoing region counting process, a ratio of the actual widths of the margin M, the narrow bar NB, the narrow space NS and the wide bar WB can be identified, that is, the encoded information of the bar code 2 can be precisely decoded.

In the prior art, a ratio of region lengths in the scanning direction in one horizontal line is used for decoding the bar code 2. On the other hand, in the foregoing preferred embodiment, a ratio of region areas in the image plane of the image sensor 16 is used for decoding the bar code 2. Although the length ratio in the prior art and the area ratio in the foregoing preferred embodiment are each indicative of a ratio of the actual widths of the respective regions of the bar code 2, since each of the areas includes a significantly greater number of the picture elements than the number of the picture elements included in each region in one horizontal line, the area ratio used in the foregoing preferred embodiment can represent more accurately the ratio of the actual widths of the respective regions of the bar code 2. Accordingly, the reading accuracy of the apparatus according to the foregoing preferred embodiment is highly improved in comparison with that of the prior art apparatus.

The decoding process of the decoding section 76 differs from that of the conventional bar code reading apparatus only in that the decoding process of the decoding section 76 uses the areas of the respective regions for decoding the bar code 2 instead of the lengths of the respective regions in the scanning direction in one horizontal line which are used in the conventional bar code reading apparatus. Accordingly, in the foregoing preferred embodiment, the bar code 2 is basically recognized and decoded based on a combination or a ratio of the widths of the bars and spaces of the bar code 2 as in the conventional bar code reading apparatus, but using the ratio of the areas BNZ which reflects the ratio of the widths of the bars and spaces of the bar code 2 with high accuracy.

As appreciated from the foregoing description, in the optical information reading apparatus according to the first preferred embodiment, the information image of the bar code label 6 captured by the image sensor 16 is stored in the image memory 44. When a command in the form of the switching signal for decoding the OCR characters 4 is provided OCR character decoding circuit 52 recognizes and decodes OCR characters 4 in the stored information image. On the other hand, when a in the form of the switching signal for decoding the bar code 2 is provided bar code decoding circuit 54 decodes bar code 2. Specifically, bar code decoding circuit 54 determines or detects he white and black regions in the stored information image, which alternately appear on the image plane of the image sensor 16 in the horizontal scanning direction when the image of bar code 2 is captured. The bar code decoding circuit 54 then derives the areas of the respective detected regions and decodes the encoded information of the bar code 2 based on the area ratio of the detected regions.

Accordingly, in the optical information reading apparatus according to the first preferred embodiment, OCR characters 4 and bar code 2 can be read with high accuracy using, as the image sensor 16, a conventionally employed inexpensive two-dimensional pickup apparatus having a relatively small number of picture elements.

Further, since bar code 2 is decoded using the areas of the bars and spaces in the information image captured by the image sensor 16, the bar code 2 can be correctly decoded even if positioned at an angle relative to the image sensor. As appreciated, since inclination of the bar code 2 relative to the image sensor 16 provides an increased number of picture elements in each of the bars and spaces in the image plane of the image sensor 16 due to an increased length (X2 in FIG. 6), the image resolution is improved in view of the area ratio of the bars and spaces.

Further, in the foregoing preferred embodiment, the information image captured by image sensor 16 is stored in image memory 44, and the bar code 2 and OCR characters 4 are decoded using the stored image data. If the bar code 2 can not be decoded normally by the bar code decoding circuit 54 when a command for decoding the bar code 2 is provided, the OCR characters 4 may be decoded by the OCR character decoding circuit 52 by changing the command to a command for decoding the OCR characters 4.

In the foregoing preferred embodiment, the operations of the decoding circuits 52 and 54 are selected by inputting a decoding command for the bar code 2 or the OCR characters 4. However, if the OCR characters 4 and the bar code 2 represent the same information, both decoding circuits 52 and 54 may be operated simultaneously in response to a decoding command and that the decoding result of the OCR characters or the bar code 2 whichever is normally decoded is automatically selected to be output via output terminal 56.

In the foregoing preferred embodiment, the present invention is embodied in a hand-held optical information reading apparatus. However, the present invention is also applicable to a stationary-type optical information reading apparatus which requires the user to move an article with a bar code label 6 attached thereon so as to read the optical information on bar code label 6. In this case, an industrial television camera apparatus may be used as the image sensor 16.

Now, a second preferred embodiment of the present invention will be described. In the second preferred embodiment, an optical information reading apparatus is arranged to read the bar code and a two-dimensional code instead of the OCR characters.

As described before, a so-called matrix code, such as, Data Code, Veri Code and the so-called stacked bar code, such as, PDF417 have been proposed as a two-dimensional code. For decoding these two-dimensional codes, different decoding processes are required.

An optical information reading apparatus which can read the bar code and Data Code will be described according to the second preferred embodiment.

Figure 8:
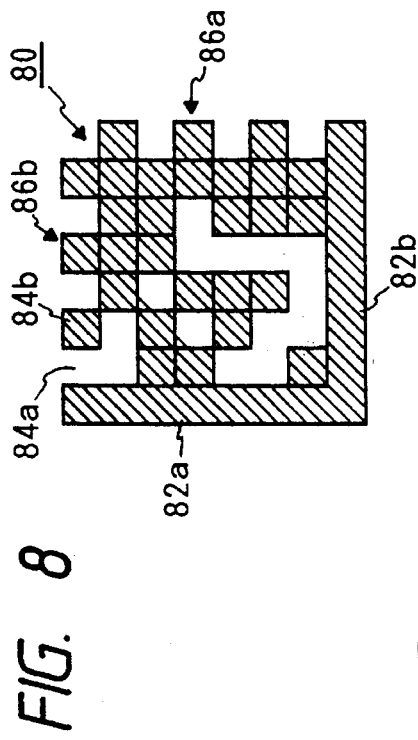
FIG. 8 is an explanatory diagram for explaining Data Code to be read by an optical information reading apparatus according to a second preferred embodiment of the present invention.

As shown in FIG. 8, Data Code 80 is formed by arranging white square cells 84a having a high reflectance or reflection factor and black square cells 84b having a low reflectance or reflection factor on a matrix defined by two orthogonal perimeter lines 82a and 82b and perimeter sides 86a and 86b located opposite the respective perimeter lines 82a and 82b. Depending on the arrangement of the white and black cells 84a and 84b, desired data can be encoded on the matrix. Each of the perimeter sides 86a and 86b is formed of white cells 84a and black cells 84b which are alternately arranged regardless of data to be encoded. By deriving the product of the number of the cells of the perimeter side 86a and the number of the cells of the perimeter side 86b, the data density, that is, the total number of the cells forming the encoded data on the matrix can be recognized. In FIG. 8, the hatched portions represent "black" and the other portions represent "white".

Figure 9:
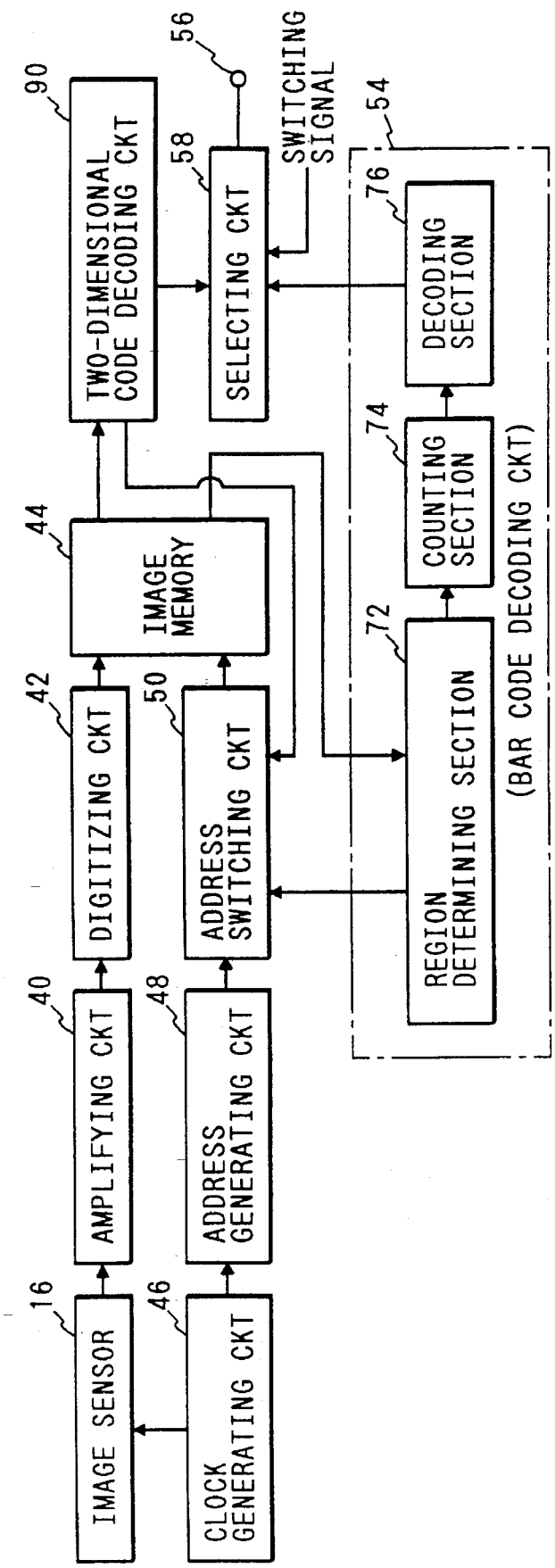
FIG. 9 is a block diagram showing the structure of a signal processing circuit in the optical information reading apparatus according to the second preferred embodiment.

As seen from FIG. 9, the optical information reading apparatus according to the second preferred embodiment differs from the optical information reading apparatus according to the first preferred embodiment only in that a signal processing circuit of FIG. 9 includes a two-dimensional code decoding circuit 90 instead of OCR character decoding circuit 52 in the signal processing circuit of FIG. 1.

Figure 10:
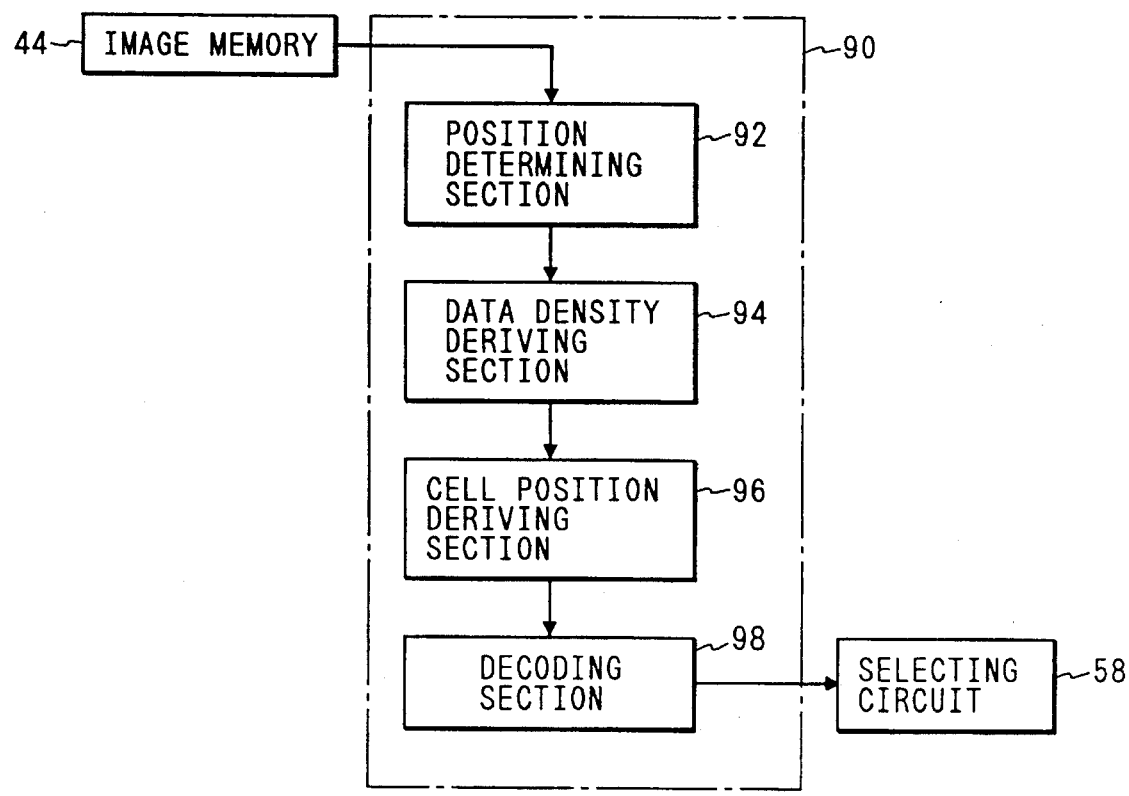
FIG. 10 is a block diagram showing the structure of a two-dimensional code decoding circuit of the signal processing circuit of FIG. 9.

As shown in FIG. 10, the two-dimensional code decoding circuit 90 includes a position determining section 92 for outputting read addresses to the address switching circuit 50 to read out the information image from the image memory 44 and for identifying positions of the perimeter sides 86a and 86b based on the perimeter lines 82a and 82b of Data Code 80 contained in the information image. The two-dimensional code decoding circuit 90 further includes data density deriving section 94 for calculating the data density based on the number of white and black cells 84a and 84b forming perimeter side 86a and the number of white and black cells 84a and 84b forming perimeter side 86b, and a cell position deriving section 96 for calculating a position of each of the cells forming the encoded data on the matrix based on the derived data density. The two-dimensional code decoding circuit 90 further includes decoding section 98 for determining the color (white or black) at each of the derived cell positions so as to identify the arrangement of white cells 84a and black cells 84b and for decoding the encoded data based on the identified arrangement. Decoding section 98 outputs the decoding result to selecting circuit 58.

Specifically, position determining section 92 identifies the positions of perimeter sides 86a and 86b based on the lengths of perimeter lines 82a and 82b and the intersecting angle between perimeter lines 82a and 82b. The data density deriving section 94 detects the numbers of "white" and "black" alternately appearing at the perimeter side 86a and the numbers of "white" and "black" alternately appearing at the perimeter side 86b and calculates the data density, that is, the total number of cells forming the encoded data on the matrix, by deriving the product of a sum of "white" and "black" at the perimeter side 86a and a sum of "white" and "black" at the perimeter side 86b. Then, cell position deriving section 96 calculates the positions of the cells on the matrix provided that the cells of the calculated number are arranged on the matrix uniformly. Thereafter, decoding section 98 determines a color (white or black) at each of the cell positions so as to identify the arrangement of white cells 84a and black cells 84b on the matrix and then decodes the encoded data based on the identified arrangement.

In the optical information reading apparatus as structured above, when the command (switching signal) for decoding bar code 2 is provided, the bar code decoding circuit 54 decodes bar code 2 using the area ratio of the respective regions as in the first preferred embodiment. If the command (switching signal) for decoding Data Code 80 (two-dimensional code) is provided two-dimensional code decoding circuit 90 recognizes and decodes Data Code 80 contained in information image stored in the image memory 44 as in the foregoing manner.

Accordingly, in the optical information reading apparatus according to the second preferred embodiment, Data Code 80 (two dimensional code) and the bar code 2 can be read accurately using, as the image sensor 16, a conventionally employed inexpensive two-dimensional pickup apparatus having a relatively small number of picture elements, as in the first preferred embodiment.

It is to be understood that this invention is not to be limited to the preferred embodiments and modifications described above, and that various changes and modifications may be made without departing from the spirit and scope of the invention as defined in the appended claims.

What is claimed is:

1. An optical information reading apparatus comprising:

a light source for emitting light onto an object bearing optical information;

an optical system for collecting said light reflected by said object so as to form an information image indicative of said optical information at a predetermined reading position;

two-dimensional image pickup means having a plurality of photoelectric conversion elements arranged in a plane, said two-dimensional image pickup means being provided at said predetermined reading position for capturing said information image;

storing means for storing said information image captured by said two-dimensional image pickup means;

two-dimensional information decoding means for recognizing two-dimensional information in said information image stored by said storing means;

region detecting means for detecting a region of each bar and a region of each space of a bar code in said information image stored by said storing means, said bars and said spaces being alternately arranged to form said bar code; and bar code decoding means for decoding said bar code based on a relationship between areas of said regions of said bars and areas of said regions of said spaces detected by said region detecting means.

2. The optical information reading apparatus as set forth in claim 1, wherein said two-dimensional information decoding means includes character decoding means for recognizing and decoding a character in said information image stored in said storing means so as to decode said recognized character.

3. The optical information reading apparatus as set forth in claim 1, wherein said two-dimensional information decoding means includes two-dimensional code decoding means for recognizing a two-dimensional code in said information image stored by said storing means so as to decode said recognized two-dimensional code, said two-dimensional code having high reflectance cells and low reflectance cells arranged in a given matrix.

4. The optical information reading apparatus as set forth in claim 2, wherein said character decoding means comprises:

character pattern storing means for prestoring basic patterns of characters to be decoded;

character matching means for reading out said information image from said storing means and for comparing in sequence a pattern of a character contained in said information image with said basic character patterns prestored by said character pattern storing means so as to derive matching degrees therebetween, respectively;

pattern switching means, in response to a character pattern changing command which is output from said matching means every time said matching means performs said pattern comparison, for changing in sequence said basic character pattern to be output from said character pattern storing means to said matching determining means; and selecting means for selecting one of said basic character patterns having a highest matching degree derived by said matching means.

5. The optical information reading apparatus as set forth in claim 3, wherein said two-dimensional code decoding means comprises:

position determining means for reading out said information image from said storing means and for determining a position of a perimeter portion of said two-dimensional code contained in said information image;

data density deriving means for deriving a data density of said two-dimensional code based on said high reflectance cells and said low reflectance cells arranged at said perimeter portion;

cell position deriving means for deriving a position of each of said cells in said matrix based on said data density derived by said data density deriving means; and decoding means for determining a reflectance at each of said cell positions derived by said cell position deriving means so as to identify an arrangement of said high reflectance cells and said low reflectance cells and for decoding said two-dimensional code based on said identified cell arrangement.

6. The optical information reading apparatus as set forth in claim 1, wherein said region detecting means comprises:

region data detecting means for reading out said information image from said storing means and for detecting region data corresponding to each of said bars and said spaces in each horizontal line of said information image;

region data storing means for storing said region data detected by said region data detecting means; and counting means for counting picture elements contained in said region data stored by said region data storing means so as to derive a total number of said picture elements forming each of said bars and said spaces in said information image.

7. The optical information reading apparatus as set forth in claim 6, wherein said region detecting means includes region data storage determining means for determining whether said region data in all of said horizontal lines are stored by said region data storing means, and wherein said counting means is operated when said region data storage determining means determines that said region data in all of said horizontal lines are stored by said region data storing means.

8. The optical information reading apparatus as set forth in claim 6, wherein said region detecting means includes region data storage determining means for determining whether said region data in all of said horizontal lines are stored by said region data storing means, and wherein said region data detecting means continues to detect said region data when said region data storage determining means determines that said region data in all of said horizontal lines are not stored by said region data storing means.

9. The optical information reading apparatus as set forth in claim 6, wherein said region data includes binary information indicative of said bar or said space, a picture element number information indicative of a number of said picture elements forming a corresponding one of said bars and said spaces in corresponding one of said horizontal lines, and positional information indicative of position of said region data in said information image.

10. The optical information reading apparatus as set forth in claim 9, wherein said positional information includes a variable which changes when said binary information is changed in a corresponding horizontal line, and horizontal line position information indicative of a position of said corresponding horizontal line in a vertical direction in said information image.

11. The optical information reading apparatus as set forth in claim 1, further comprising selecting means for selectively activating one of said two-dimensional information decoding means and said bar code decoding means and for outputting a decoding result of the activated decoding means.

12. The optical information reading apparatus as set forth in claim 1, further comprising selecting means for simultaneously activating said two-dimensional information decoding means and said bar code decoding means and for outputting one of decoding results of said two-dimensional information decoding means and said bar code decoding means based on said decoding results.

13. An optical information reading apparatus comprising:

a light source for emitting light onto an object bearing optical information;

an optical system for collecting said light reflected by said read object so as to form an information image indicative of said optical information at a predetermined reading position;

two-dimensional image pickup means having a plurality of photoelectric conversion elements arranged in a plane, said two-dimensional image pickup means being provided at said predetermined reading position for capturing said information image;

storing means for storing said information image captured by said two-dimensional image pickup means;

two-dimensional information decoding means for recognizing two-dimensional information in said information image stored by said storing means;

area deriving means for detecting a bar code contained in said information image stored by said storing means, said bar code having a bar and a space, and for determining an area of each bar and each space of said bar code included in said information image stored by said storing means; and bar code decoding means for decoding said bar code based on a relationship between areas of said bars and areas of said spaces detected by said area deriving means.

14. An optical information reading apparatus comprising:

a light source for emitting light onto an object bearing optical information;

an optical system for collecting said light reflected by said object so as to form an image indicative of said optical information at a predetermined reading position;

two-dimensional image pickup means having a plurality of photoelectric conversion elements arranged in a same plane, said two-dimensional image pickup means provided at said predetermined reading position for capturing said image indicative of said optical information;

storing means for storing said image captured by said two-dimensional image pickup means;

two-dimensional information decoding means for recognizing two-dimensional information in said image stored by said storing means; and area detecting means for detecting a two-dimensional area of each bar and a two-dimensional area of each space in said bar code information included in said image stored by said storing means, and bar code decoding means for decoding said bar code information based on a relationship between said two-dimensional areas of said bars and said two-dimensional areas of said spaces detected by said area detecting means.

15. The optical information reading apparatus as set forth in claim 14, wherein said two-dimensional information decoding means includes character decoding means for recognizing and decoding a character in said information image stored in said storing means.

16. The optical information reading apparatus as set forth in claim 14, wherein said two-dimensional information decoding means includes two-dimensional code decoding means for recognizing and decoding a two-dimensional code in said information image stored by said storing means, said two-dimensional code having a plurality of high reflectance cells and a plurality of low reflectance cells arranged in a matrix.

17. The optical information reading apparatus as set forth in claim 15, wherein said character decoding means comprises:

character pattern storing means for storing patterns of characters;

character matching means for reading out said image from said storing means, sequentially comparing a pattern of a character contained in said image to said character patterns stored in said character pattern storing means, and determining matching degrees between said character contained in said image and said character patterns stored in said character pattern storing means;

pattern switching means, in response to said matching means when said matching means compares said character contained in said image and said character patterns stored in said character pattern storing means, for sequentially changing said character pattern output from said character pattern storing means to said matching determining means; and selecting means for selecting one of said character patterns having a highest matching degree derived by said matching means.

18. The optical information reading apparatus as set forth in claim 16, wherein said two-dimensional code decoding means comprises:

position determining means for reading out said image from said storing means and for determining a position of a perimeter portion of said two-dimensional code contained in said image;

data density deriving means for deriving a data density of said two-dimensional code based on said plurality of high reflectance cells and said plurality of low reflectance cells arranged at said perimeter portion;

cell position deriving means for deriving a position of each of said cells in said matrix based on said data density derived by said data density deriving means; and decoding means for determining a reflectance at each of said cell positions derived by said cell position deriving means so as to identify an arrangement of said plurality of high reflectance cells and said plurality of low reflectance cells and for decoding said two-dimensional code based on said identified cell arrangement.

19. The optical information reading apparatus as set forth in claim 14, wherein said area detecting means comprises:

data detecting means for reading out said image from said storing means and for detecting data corresponding to each of said bars and said spaces in each of a plurality of horizontal lines of said image;

data storing means for storing said data detected by said region data detecting means; and counting means for counting picture elements contained in said data stored by said data storing means so as to derive a total number of said picture elements forming each of said bars and said spaces in said information image.

20. The optical information reading apparatus as set forth in claim 19, wherein said area detecting means includes data storage determining means for determining whether said data in all of said plurality of horizontal lines are stored by said data storing means, and wherein said counting means is operated when said data storage determining means determines that said data in all of said plurality of horizontal lines are stored by said data storing means.

21. The optical information reading apparatus as set forth in claim 19, wherein said area detecting means includes data storage determining means for determining whether said data in all of said plurality of horizontal lines are stored by said data storing means, and wherein said data detecting means continues to detect said data corresponding to each of said bars and said spaces when said data storage determining means determines that said data in all of said plurality of horizontal lines has not been stored by said region data storing means.

22. The optical information reading apparatus as set forth in claim 19, wherein said data includes binary information indicative of a presence of one of said bar or and said space, picture element number information indicative of a number of picture elements forming a corresponding one of said bars and said spaces in corresponding one of said plurality of horizontal lines, and positional information indicative of position of said data in said image.

23. The optical information reading apparatus as set forth in claim 22, wherein said positional information includes a variable which changes when said binary information is changed in a corresponding horizontal line, and horizontal line position information indicative of a position of said corresponding horizontal line in a vertical direction in said information image.

24. The optical information reading apparatus as set forth in claim 14, further comprising selecting means for simultaneously activating said two-dimensional information decoding means and said bar code decoding means.

25. The optical information reading apparatus as set forth in claim 1, wherein said bar code decoding means decodes said bar code based on a ratio between said areas of said regions of said bars and said areas of said regions of said spaces detected by said region detecting means.

26. The optical information reading apparatus as set forth in claim 13, wherein said bar code decoding means decodes said bar code based on a ratio between said areas of said bars and said areas of said spaces detected by said area deriving means.

27. The optical information reading apparatus as set forth in claim 1, wherein said bar code decoding means decodes said bar code information based on a ratio between said two-dimensional areas of said bars and said two-dimensional areas of said spaces detected by said area detecting means.

* * * * *